United States Patent Office 3,092,517
Patented June 4, 1963

3,092,517
NON-POROUS HYDROGEN DIFFUSION FUEL CELL ELECTRODES
Harry G. Oswin, Elmsford, N.Y., assignor to Leesona Corporation, Cranston, R.I., a corporation of Massachusetts
No Drawing. Filed Aug. 24, 1960, Ser. No. 51,515
4 Claims. (Cl. 136—86)

This invention relates to improved fuel cell electrodes. More particularly the invention relates to fuel cell electrodes comprising a non-porous palladium-silver alloy hydrogen-diffusion electrode.

"Fuel cell," as used in this specification, is the name commonly applied to an electrochemical cell capable of generating electrical energy through electrochemical combustion of a fuel gas with an oxygen containing gas. These cells have been fully described in the literature. Their precise construction and operation does not form a part of the instant invention except in an incidental capacity. However, a brief description of the nature and construction of a simple fuel cell is believed helpful, if not essential, in understanding the function and importance of the present invention.

In general, the simplest fuel cell comprises a housing, two electrodes and an electrolyte which acts as an oxygen transferring medium. An oxidizing gas such as air under super-atmospheric pressure is circulated on one side of the oxidizing electrode and a fuel gas such as hydrogen, under super-atmospheric pressure is circulated on one side of the other electrode. A three-phase interface exists at each electrode, i.e., gas, electrolyte, and solid where a process of adsorption and de-adsorption occurs generating an electrochemical force. When current is drained from the two electrodes there is a net flow of electrons from the fuel gas side through an external electrical circuit to the oxidizing gas side. Thus, according to the external electron flow convention, the oxidizing gas electrode is the positive electrode and the fuel gas electrode is the negative electrode. Oxygen is consumed at the positive electrode surface and fuel gas is oxidized into products of combustion at the negative electrode surface. The result is accompanied by release of a portion of the energy of combustion as electrical energy while the remainder is released as heat.

In the past it was necessary to regulate the three-phase interface of solid-gas-electrolyte by a suitable combination of pore size, pressure differential of the gas, and surface tension of the electrolyte. As a practical matter, however, it is impossible to maintain completely uniform pore size; thus, the cell is always operated with some of the smaller cells flooded with electrolyte due to capillary action or with gas bubbling through the larger pores unused. To a large extent the advent of a bi-porous electrode structure solved this problem. In a bi-porous system, large pores front the gas of the fuel cell system and the smaller pores face the electrolyte. A three-phase interface occurs substantially at the bi-porous wall.

Bi-porous electrodes, however, are not the complete answer to the problem inasmuch as bi-porous structures are fabricated from carefully fractionated metal powders having well defined grain size by a process of sintering, compacting, etc., which results in a relatively expensive electrode. In addition, the oxidation of hydrogen at the three-phase interface results in water formation within the porous structure which presents a serious removal problem. Further, the prior art electrodes required the use of pure hydrogen, since impurities in the gas will block the pores of the electrode, preventing diffusion of the hydrogen to the three-phase interface.

Accordingly it is an object of the present invention to provide a non-porous hydrogen diffusion electrode, thus eliminating the problem of flooding and bubbling of gas through the pores.

It is another object of the invention to provide a hydrogen diffusion electrode capable of utilizing impure hydrogen.

It is another object of the invention to provide a hydrogen diffusion electrode in which it is not essential to accurately control the pressure of the hydrogen fuel gas.

It is still another object of the invention to provide a hydrogen diffusion electrode which eliminates the problem of water formation within the porous structure.

These and other objects of the invention will be apparent from the following description with particular emphasis being directed to the specific examples.

Briefly, the objects of the instant invention are accomplished by fabricating a hydrogen diffusion electrode comprising a thin non-porous palladium-silver alloy membrane through which hydrogen diffuses as protons or hydrogen atoms. In the fuel cell, the fuel gas is circulated on one side of the membrane and the other face of the electrode fronts the electrolyte into which the hydrogen will diffuse as a proton. The system is illustrated graphically as follows, with FIG. 1 utilizing an acid electrolyte and FIG. 2 utilizing an alkaline electrolyte.

FIGURE 1

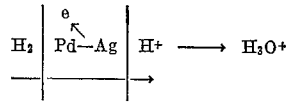

FIGURE 2

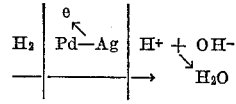

As is apparent from the above figures hydrogen gas is diffused through the Pd-Ag alloy membrane separating an electron from the hydrogen and passing the proton into the electrolyte. The electron is drawn off and carried, via an external route, to the oxidizing electrode for consumption.

Since only hydrogen is diffused through the palladium-silver alloy membrane impure hydrogen gas, containing carbon dioxide, carbon monoxide, water, methane, ammonia, etc. can be used as the fuel gas. The hydrogen will diffuse through the membrane and the gaseous impurities can easily be removed by suitable venting. The impurities, being concentrated inside the membrane, cannot contaminate the electrolyte. Thus, an electrode capable of using relatively cheap impure hydrogen in an important feature of the instant invention.

Pure palladium membranes are operable for electrode fabrication, however it has been found that palladium-silver alloys are surprisingly superior to pure palladium. Palladium-silver alloys containing from 5–40% by weight of silver have been demonstrated to produce good results with an alloy composed of about 25% silver and 75% palladium showing optimum fuel cell electrode properties. Palladium-silver alloy membranes were found to be superior to pure palladium membranes in mechanical properties and do not become brittle even after long periods of exposure to hydrogen under operating fuel cell conditions. Further, diffusion of hydrogen through a silver-palladium alloy electrode was found to be approximately three times that of diffusion through a pure palladium electrode at 500° F. and polarization under identical conditions was only about one-third as great. Another important feature was the potential stability of the Pd-Ag membrane fuel cell systems, whereas pure Pd membrane fuel cell systems exhibit a tendency to wander.

The instant hydrogen-diffusion electrodes can be utilized in fuel cell systems operating in a wide temperature range. However, for good hydrogen diffusion it is desirable that the temperature of the system be in excess of 100° C. but not over 700° C., with the preferred range being in the neighborhood of 150–300° C. While fuel cell systems comprising the instant electrodes can be operated at lower temperatures, their behavior at such temperatures is somewhat erratic.

The thickness of the palladium-silver alloy membranes for use as the electrode depends to a large degree upon the pressure differential to be applied across the membrane and upon the rapidity of diffusion desired. Diffusion of hydrogen gas through the membrane is proportional to the pressure differential across the membrane and the membrane's thickness. The minimum thickness is immaterial as long as the membrane is structurally able to withstand the necessary pressure of the fuel cell. The preferred range of thickness is from approximately .05 mil to 30 mils. The membranes can be fabricated as flat supported sheets, or as a corrugated or tubular construction. Usually tubular construction is preferred since the effective surface area of the electrode is increased and it is ideal for bi-polar or multi-polar cells. Additionally a tubular structure will withstand greater pressure. For example a tube of 0.003 inch thickness, having a 1/16 inch outside diameter will withstand at least 1000 p.s.i. pressure and will sustain very high current densities.

The instant electrodes can be operated with a variety of acid and alkaline electrolytes such as sulfuric acid, phosphoric acids, potassium hydroxide, sodium hydroxide, etc. An outstanding feature of the electrode is that the formation of water occurs only in the electrolyte and not in the electrode structure. Thus, the water does not affect the hydrogen diffusion and can be conveniently removed from the electrolyte by suitable means.

Another, and probably the most unusual and surprising feature of the instant invention is the ability of Pd-Ag membrane electrodes to act as their own metering valve. It would logically be expected that an electrode at 250° C. would bubble hydrogen under open circuit conditions. However, this is not the case with the instant systems. When the circuit is open the hydrogen does not diffuse through the membrane, but as soon as the circuit is closed the electrode responds and hydrogen gas is metered through. This is a particularly desirable and unexpected characteristic of the instant system.

The explanation for this unusual phenomenon is not understood, however, it is theorized that the hydrogen dissociates into protons and electrons at the first surface of the palladium-silver alloy membrane. When the protons and electrons reach the second surface of the membrane they recombine on adjacent Pd atoms of the lattice if no electrolyte is present, reforming hydrogen gas. However, when electrolyte is present, due to the presence of other chemisorbed ionic forms such as $-OH^-$, $Na^+$, $K^+$, the recombination does not occur inasmuch as the surface diffusion is restricted and consequently there are fewer Pd-Pd and H-H pairs available, needed for the diffusion. However, when the circuit is closed and electrons are drawn off by an external route, the hydrogen protons will pass through and combine with the hydroxyl ions of the electrolyte. The instant explanation is only theoretical and is not intended to limit the invention. There is no explanation from the prior art which would lead one to expect a phenomenon of this type. Thus, the electrodes of the instant invention are distinctly superior to what would be predicted or expected.

The following examples are set forth to more particularly illustrate the invention. However, they are not to be construed as limiting. Other embodiments can be conveniently produced without departing from the scope of the invention.

*Example I*

A fuel cell system having a metallic nickel-nickel oxide oxidizing electrode, a 75–25% palladium-silver alloy membrane of 0.003 inch thickness as the fuel electrode and using a 90% aqueous potassium hydroxide electrolyte was constructed in a suitable housing. The cell was operated at 45 p.s.i. differential pressure at 250° C., at which conditions the diffusion rate of hydrogen through the membrane was approximately 25 ft.$^3$/hr./ft.$^2$. The cell had a half-cell polarization at 450 ma./cm.$^2$ of 0.2 volt and at 810 ma./cm.$^2$ of 0.42 volt.

*Example II*

In the above cell an impure gas containing 90% hydrogen and 10% nitrogen was substituted for pure hydrogen. The gas was circulated through a tubular Pd-Ag alloy electrode, allowing the hydrogen to diffuse through the membrane and the impurities removed by venting. The cell sustained substantially the same current density, within the limits of experimental error, as a cell using pure hydrogen fuel under the same conditions. The instant electrode was operated continuously at 450 ma./cm.$^2$ for 16 hours. Neither the current density nor polarization changed over this period.

Fuel cells utilizing the electrodes of the instant invention responded very rapidly to operating conditions and are substantially superior to nickel electrodes under similar conditions. However, it was noted that the operating efficiency of fuel cells utilizing the instant hydrogen diffusion electrodes was slightly impaired by substantial amounts of olefinic compounds in contact with the electrode because of electrode poisoning. This feature can be easily remedied by reactivating the electrode by flushing the membrane with oxygen gas at temperatures of from about 200–500° C. Additionally, it may be desirable to activate the membrane by surface treatment at either the gas or electrolyte face with a very thin film of another metal such as nickel or platinum to maintain high half-cell potentials.

The instant invention is not to be limited by the illustrated examples. It is possible to produce still other embodiments without departing from the inventive concept herein disclosed. Such embodiments are within the ability of one skilled in the art.

It is claimed and desired to be secured by Letters Patent:

1. In a fuel cell comprising a housing, at least one fuel electrode, at least one oxidizing electrode and an electrolyte, the improvement wherein hydrogen is employed as the fuel and the fuel electrode is a non-porous palladium-silver alloy membrane.

2. The improved fuel cell of claim 1 wherein the non-porous palladium-silver alloy membrane is composed of from about 5–40% silver with the remainder being palladium.

3. The improved fuel cell of claim 1 wherein the non-porous palladium-silver alloy membrane is composed of about 25% silver and about 75% palladium.

4. A fuel cell for the direct generation of electricity comprising a non-porous hydrogen diffusion palladium-silver alloy membrane anode, a cathode and an aqueous alkaline electrolyte.

References Cited in the file of this patent

UNITED STATES PATENTS

| | | |
|---|---|---|
| 353,141 | Kendall | Nov. 23, 1886 |
| 2,901,523 | Justi et al. | Aug. 25, 1959 |